United States Patent
Wu et al.

(10) Patent No.: US 9,405,122 B2
(45) Date of Patent: Aug. 2, 2016

(54) DEPTH-DISPARITY CALIBRATION OF A BINOCULAR OPTICAL AUGMENTED REALITY SYSTEM

(71) Applicants: Wanmin Wu, Redwood City, CA (US); Ivana Tošić, San Francisco, CA (US)

(72) Inventors: Wanmin Wu, Redwood City, CA (US); Ivana Tošić, San Francisco, CA (US)

(73) Assignee: Ricoh Co., Ltd, Tokyo (JP)

( * ) Notice: Subject to any disclaimer, the term of this patent is extended or adjusted under 35 U.S.C. 154(b) by 64 days.

(21) Appl. No.: 14/296,396

(22) Filed: Jun. 4, 2014

(65) Prior Publication Data
US 2015/0213648 A1    Jul. 30, 2015

Related U.S. Application Data
(60) Provisional application No. 61/933,178, filed on Jan. 29, 2014.

(51) Int. Cl.
| | |
|---|---|
| G06T 15/00 | (2011.01) |
| G06T 15/20 | (2011.01) |
| G09G 5/00 | (2006.01) |
| G06K 9/00 | (2006.01) |
| G06K 9/36 | (2006.01) |
| G06K 9/32 | (2006.01) |
| G02B 27/01 | (2006.01) |
| H04N 13/00 | (2006.01) |
| G06T 11/00 | (2006.01) |
| G06T 19/00 | (2011.01) |
| G06T 3/40 | (2006.01) |
| G06T 7/00 | (2006.01) |
| G09G 5/14 | (2006.01) |

(Continued)

(52) U.S. Cl.
CPC .......... *G02B 27/0172* (2013.01); *G02B 27/017* (2013.01); *G06T 3/4038* (2013.01); *G06T 7/002* (2013.01); *G06T 7/0028* (2013.01); *G06T 7/0075* (2013.01); *G06T 11/00* (2013.01); *G06T 15/20* (2013.01); *G06T 19/00* (2013.01); *G06T 19/006* (2013.01); *G09G 5/14* (2013.01); *H04N 13/0022* (2013.01); *H04N 13/0275* (2013.01); *G02B 2027/014* (2013.01); *G02B 2027/0127* (2013.01); *G02B 2027/0138* (2013.01); *H04N 2013/0465* (2013.01)

(58) Field of Classification Search
CPC ....... G06T 19/00; G06T 11/60; G06T 19/006; G06T 15/005; G06T 7/0075; G06T 3/4038; G06T 7/0028; G06T 11/00; G06T 15/20; G09G 5/14; G06K 9/00791; G01C 3/16
See application file for complete search history.

(56) References Cited

U.S. PATENT DOCUMENTS

| | | | |
|---|---|---|---|
| 2002/0113756 A1* | 8/2002 | Tuceryan | G02B 27/017 345/8 |
| 2010/0039502 A1* | 2/2010 | Robinson | G06T 7/0075 348/47 |
| 2012/0242697 A1* | 9/2012 | Border | G02B 27/0093 345/633 |

*Primary Examiner* — Phi Hoang
*Assistant Examiner* — Andrew Shin
(74) *Attorney, Agent, or Firm* — Patent Law Works LLP

(57) ABSTRACT

The disclosure includes a system and method for calibrating a binocular optical see-through augmented reality display. A calibration application renders a virtual object to overlay and align with a real-world object on the display, receives a depth between the real-world object and the eyes of the user, receives user input to move the virtual object on the display for depth-disparity calibration, and determines a mapping between the depth and the disparity.

20 Claims, 11 Drawing Sheets

(51) Int. Cl.
*H04N 13/02* (2006.01)
*H04N 13/04* (2006.01)

DEPTH-DISPARITY CALIBRATION OF A BINOCULAR OPTICAL AUGMENTED REALITY SYSTEM

CROSS REFERENCE TO RELATED APPLICATIONS

The present application claims priority, under 35 U.S.C. §119, of U.S. Provisional Patent Application Ser. No. 61/933,178, filed Jan. 29, 2014 and entitled "Binocular Optical See-Through System and Associated Calibration Procedure," which is incorporated herein by reference in its entirety.

BACKGROUND

1. Field of the Invention

The specification relates to calibrating a binocular optical see-through augmented reality display based on user input. In particular, the specification relates to a system and method for determining a depth-disparity mapping or joint three dimension (3D) calibration integrating two dimension (2D) positional calibration and depth calibration.

2. Description of the Background Art

Existing portable computing devices have fundamental limitations when it comes to enabling augmented reality applications. While there exists a few near-eye displays that can show virtual information, they exhibit deficiencies including a small field of view, limited 3D capabilities and limited augmented reality support.

SUMMARY

The disclosure includes a system and method for calibrating a binocular optical see-through augmented reality display. In one embodiment, the system includes a calibration application. The calibration application is configured to render a virtual object on a display of a human interface module positioned relative to a real world object; to receive user input to align the virtual object with the real-world object at a first depth between the eyes of the user and the real world object; to determine a disparity for the first depth based on the user input to align the virtual object with the real-world object; and to determine a mapping between the first depth and the disparity. For example, the virtual object is overlaid on top of the real-world object and the user's eyes converge to the depth of the real-world object and perceive the virtual object as being associated with the real-world object based on the mapping between the depth parameter and the disparity parameter. The disclosure also includes methods for determining a depth between the display of the human interface module and the real world object; performing the calibration at a plurality of depths; use of an estimated depth disparity mapping constant based on inter-pupillary distance (IPD); calibration using paired eyes; calibration using separate eyes; and calibration using 2D position mapping and depth-disparity mapping.

Other aspects include corresponding methods, systems, apparatuses, and computer program products for these and other innovative aspects.

The specification describes depth-disparity calibration procedures for a binocular optical see-through augmented reality display. Important advantages of the techniques described herein are the depth-disparity calibration with or without need for fusion, joint 3D data collection using 2D position mapping and depth-disparity mapping; and estimation of a depth-disparity mapping with a constant parameter C.

BRIEF DESCRIPTION OF THE DRAWINGS

The techniques introduced herein are illustrated by way of example, and not by way of limitation in the figures of the accompanying drawings in which like reference numerals are used to refer to similar elements.

DETAILED DESCRIPTION

Figure 1:
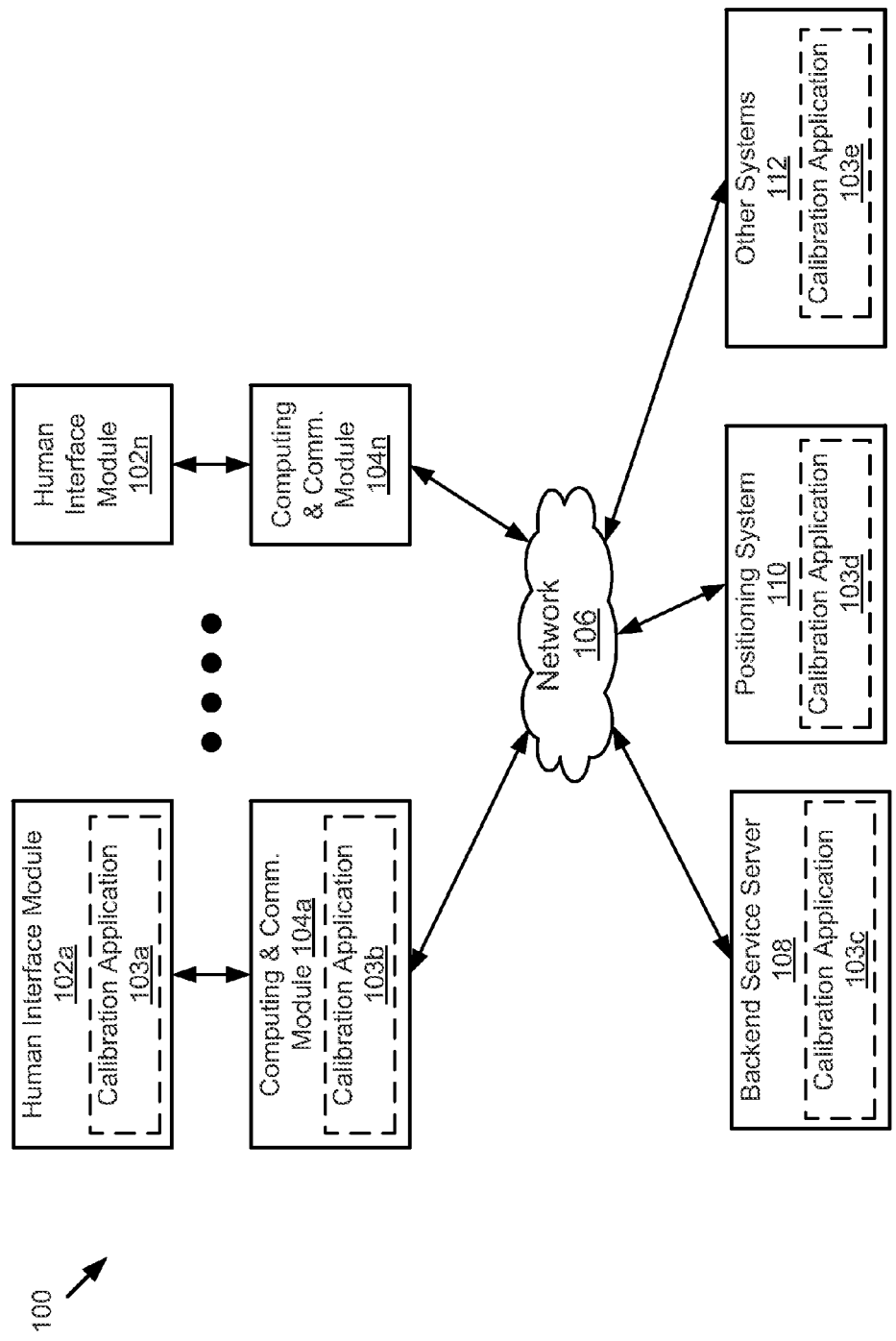
FIG. 1 is a high-level block diagram illustrating one embodiment of a system for calibrating a binocular optical see-through augmented reality display.

FIG. 1 illustrates a block diagram of a system 100 for calibrating an optical see-through augmented reality display according to one embodiment. The illustrated system 100 may include human interface modules 102a . . . 102n, computing and communication modules 104a . . . 104n, a backend service server 108, a positioning system 110 and other systems 112. In FIG. 1 and the remaining figures, a letter after a reference number, e.g., "102a," represents a reference to the element having that particular reference number. A reference number in the text without a following letter, e.g., "102," represents a general reference to instances of the element bearing that reference number. In the illustrated embodiment, these entities of the system 100 are communicatively coupled via a network 106.

The network 106 can be a conventional type, wired or wireless, and may have numerous different configurations including a star configuration, token ring configuration or other configurations. Furthermore, the network 106 may include a local area network (LAN), a wide area network (WAN) (e.g., the Internet), and/or other interconnected data paths across which multiple devices may communicate. In some embodiments, the network 106 may be a peer-to-peer network. The network 106 may also be coupled to or include portions of a telecommunications network for sending data in a variety of different communication protocols. In some embodiments, the network 106 may include Bluetooth communication networks or a cellular communications network for sending and receiving data including via short messaging service (SMS), multimedia messaging service (MMS), hypertext transfer protocol (HTTP), direct data connection, WAP, email, etc. Although FIG. 1 illustrates one network 106 coupled to the human interface modules 102n, computing and communication modules 104n, the backend service server 108, a positioning system 110 and other systems 112, in practice one or more networks 106 can be connected to these entities.

In one embodiment, the calibration application 103a may be operable on the human interface module 102a, which is coupled to a corresponding computing and communication module 104a. In one embodiment, the human interface module 102a and the computing and communication module 104a are preferably portable and used together by a single user. In one embodiment, the human interface module 102a may be a wearable computing device that may include a memory, a processor, an image delivery and display mechanism, an audio delivery or speaker mechanism, and audio capture capability. For example, the human interface module 102 may take the form of binocular eyeglasses.

In one embodiment, the human interface module 102 may include an image delivery and display mechanism that provides a wide field of view to present large images, a binocular see-through (transparent) display, or display images in three dimensions. In another embodiment, the image delivery and display mechanism in the human interface module 102 may include a binocular optical see-through augmented reality display system. The image delivery and display mechanism seamlessly positions a digital, virtual visualization (such as graphics, texts, images, and videos) proximate the real-world, e.g., placing a virtual 3D chart on a physical table top. In some embodiments, the digital or virtual visualization or representation is overlaid or superimposed on a real-world object or background. The term "overlay" unless specified otherwise will refer to the positioning of the digital representation relative to a real-world object or background. In one embodiment, the image delivery and display mechanism of the human interface module 102 may include a projection capability for in-eye projection of virtual images overlaid on top of real-world objects. In another embodiment, the image delivery and display mechanism projects the virtual images onto the lenses of glasses forming the human interface module 102. In still another embodiment, the image delivery and display mechanism in the human interface module 102 projects the image on the wall, desktop, tabletop or nearby surface. In one embodiment, the image delivery and display mechanism in the human interface module 102 may include laser diodes, scanning fiber display, scanned light display, 3-D displays (stereoscopic, automultiscopic or volumetric), light field, substrate-guided optics, light-guided optical elements, etc. In one embodiment, the image delivery and display mechanism may include adaptive optics to correct for the visual ability of the user so that the human interface module 102 can be used by anyone irrespective of whether they require prescription glasses. In another embodiment, the image delivery and display mechanism cooperates with other sensors and systems to detect the ambient light conditions and provide for control either automatically or under user control of per pixel opacity of display. It should be understood that other dimming mechanisms such as application of ultraviolet light or electrical signals to the glasses of the human interface module 102 may also be provided to make the display modulate the level of ambient light that enters the display.

The human interface module 102 is in general a wearable display device that permits a scene adapted overlay of virtual information on the real world objects. Regardless of the specific embodiment, reference to the terms "overlay," "overlays" or "overlaid" refers to scene adapted overlay. In the embodiment of the present disclosure, the image delivery and display mechanism "overlays" information related to the user on a field of view or retrieved information is "overlaid" over a field of view. In other words, the user is able to see the real world that is not blocked by the overlay. In the preferred embodiment, the image delivery and display mechanism is a see-through medium through which the real world can be seen by the eyes of the user and on which virtual objects can be displayed overlaid on top of or next to real objects. For example, this overlay may be achieved with the image delivery and display mechanism projecting information into the eye so that the projected information can be seen on a virtual image plane positioned at a certain distance from the eyes, while the real world may be seen through an optical eye-piece placed in front of the eye. In a second embodiment, the image delivery and display mechanism projects the information and the area behind the virtual image plane is made opaque occluding the real word behind it as much as possible, however, the portion of real world that is not blocked by the projected overlay can be seen by the user. Given the entire scene information, the image delivery and display mechanism selects specific means of rendering, e.g. high luminance contrast, or color contrast, font style/size and type, etc., so the projected information is visible against a background of the real world. The overlaid virtual object can completely block the light reflected from the real object or can partially transmit light.

The audio delivery or speaker system in the human interface module 102 may include an audio output device that provides mono or stereo sound to the user. The human interface module 102a also may include the ability to capture images, sound, motion and various other information using different sensors. For example, the human interface module 102a processes images and recognizes gestures as one method for manipulating data presented by the human interface module 102a. For another example, the human interface module 102a may capture real-world scenes and deliver them to the computing and communication module 104a, in real time, which processes the images to generate 3D depth map of the scene and/or perform object recognition. In some embodiments, the human interface module 102a may include a portable light source.

In one embodiment, the calibration application 103b may be operable on the computing and communication module 104a, which is coupled to the network 106. The computing and communication module 104a is coupled to the human interface module 102a. The human interface module 102 and the computing and communication modules 104 together are therefore able to communicate via the network 106 with any of the backend service server 108, the positioning system 110, or other systems 112. In one embodiment, the computing and communication module 104a provides computational support for the human interface module 102a. In another embodiment, the computing and communication module 104a provides general graphics and multimedia processing for any type of application. For example, the computing and communication module 104a can be a laptop computer, a desktop computer, a tablet computer, a smartphone, a personal digital assistant (PDA), a mobile email device, etc. In another example, the computing and communication module 104a may be a bracelet, a pendant, a watch, a headset, eyeglasses or other wearable computing forms. In one embodiment, the computing and communication module 104a may operate using conventional operating systems. In another embodiment, the computing and communication module 104a also has high-bandwidth communication capabilities for communication with the network 106.

The human interface modules 102a . . . 102n and the computing and communication modules 104a . . . 104n in FIG. 1 are used by way of example. While FIG. 1 illustrates only two human interface modules 102a and 102n and computing and communication modules 104a and 104n, the disclosure applies to a system architecture having one or more human interface modules 102 and one or more computing and communication modules 104.

In one embodiment, the calibration application 103c may be operable on the backend service server 108 capable of providing a service, which is coupled to the network 106. In one embodiment, the backend service server 108 may be either a hardware server or a software server. In another embodiment, the backend service server 108 may be entirely hardware, entirely software, or a combination of hardware and software. The backend service server 108 may be a computing device including a processor, a memory, applications, a database, and network communication capabilities. Although only a single backend service server 108 is shown in FIG. 1, it should be understood that there may be any number of backend service servers 108 or a server cluster. In other embodiments, different servers offer different services. For example, different service components in the backend service servers 108 may provide services related to a particular business vertical such as banking, retail sales, transportation, food service, hotel and housing, etc. Similarly different service components in the backend service servers 108 may provide different types of computing functions such as image processing, scene analysis, facial recognition, iris detection and authentication, voice recognition, encryption, translation, format conversion, etc.

In one embodiment, the calibration application 103d may be operable on the positioning system 110, which is coupled to the network 106. The positioning system 110 may be a series of sensors, a grid or array of sensors, or beacons for detecting the location and orientation of the human interface module 102 and/or the computing and communication module 104. For example, the positioning system 110 may also use data from the human interface module 102 and/or the computing and communications module 104 to determine the location and orientation of the modules. For example, various indoor systems may be used to get precise location and orientation information for smaller environments where the human interface module 102 and the computing and communications module 104 will be used. The positioning system 110 may use GPS, Wi-Fi positioning, cellular positioning, MEMS sensors, Bluetooth beacons, indoor messaging systems, near field communications, RFID, ultrasonic beacons, camera networks, etc. Still more specifically, in some embodiments, the positioning system 110 may provide a depth measurement from an eye of the user to a real world object or position.

In one embodiment, the calibration application 103e may be operable on the other systems 112, which may be coupled to the network 106. The other systems 112 in FIG. 1 represent other existing systems. For example, the other systems 112 may include motion sensors, wall displays, coffee makers, projection systems for lighting control, temperature sensors, ambient light sensors, body health monitoring sensors, pollution sensors, radiation sensors, HVAC systems, etc. The human interface module 102 and the computing and communications module 104 are capable of interfacing and interacting with other systems 112. The human interface module 102 and the computing and communications module 104 can send information and commands to the other systems 112 or receive information from the other systems 112. For example, a depth sensor in the form of a time of flight sensor, a laser range finder, a structure light sensor, a plenoptic sensor, etc. may determine a depth of a real-world object from an eye of the user, and send the information to the human interface module 102 directly or via the computing and communications module 104.

In one embodiment, the calibration application 103 acts as a thin-client application that may be stored in part on the human interface module 102, in part on the computing and communication module 104, in part on the backend service server 108, and in part as a component of the positioning system 110. For example, the calibration application 103a on the human interface module 102 could include software for capturing the image of the real-world scene and, in some embodiments, could perform 3D depth map generation. The calibration application 103a may send user depth-disparity calibration data to the calibration application 103c on the backend service server 108 to determine correct mapping of depth and disparity.

The calibration application 103 may include software and/ or logic to provide the functionality for performing calibration. In one embodiment, the calibration application 103 can be implemented using hardware including a field-programmable gate array (FPGA) or an application-specific integrated circuit (ASIC). In another embodiment, the calibration application 103 can be implemented using a combination of hardware and software. In other embodiments, the calibration application 103 may be stored in a combination of the devices and servers, or in one of the devices or servers.

In one embodiment, the calibration application 103 renders a virtual object positioned relative to a real-world object. More specifically, the calibration application 103 renders a virtual object on the display of the human interface module 102 so that it may be modified in position in response to user input until it appears overlaid and aligned with a real-world object when viewed through the human interface module 102. For example, the calibration application 103 initially, renders the virtual object at a certain position (e.g., center of the screen), and then relies on the user to move the virtual object to align it. The calibration application 103 determines a depth of the real-world object from the eye of the user. The calibration application 103 receives user input to move the virtual object on the display for depth-disparity calibration. The calibration application 103 determines whether the depth-disparity calibration is complete (e.g., the user sees a virtual object aligned in depth with the real-world object). The calibration can be determined as completed based on input from the user, processing by the calibration application 103 or both. The calibration application 103 determines a mapping between the depth and the disparity responsive to the calibration being complete. In another embodiment, the calibration application 103 determines a mapping between the 3D point coordinates of the real-world object and 2D pixel coordinates of the virtual object on the display. The operation of the calibration application 103 and the functions listed above are described below in more detail below with reference to FIGS. 3-10.

Figure 2:
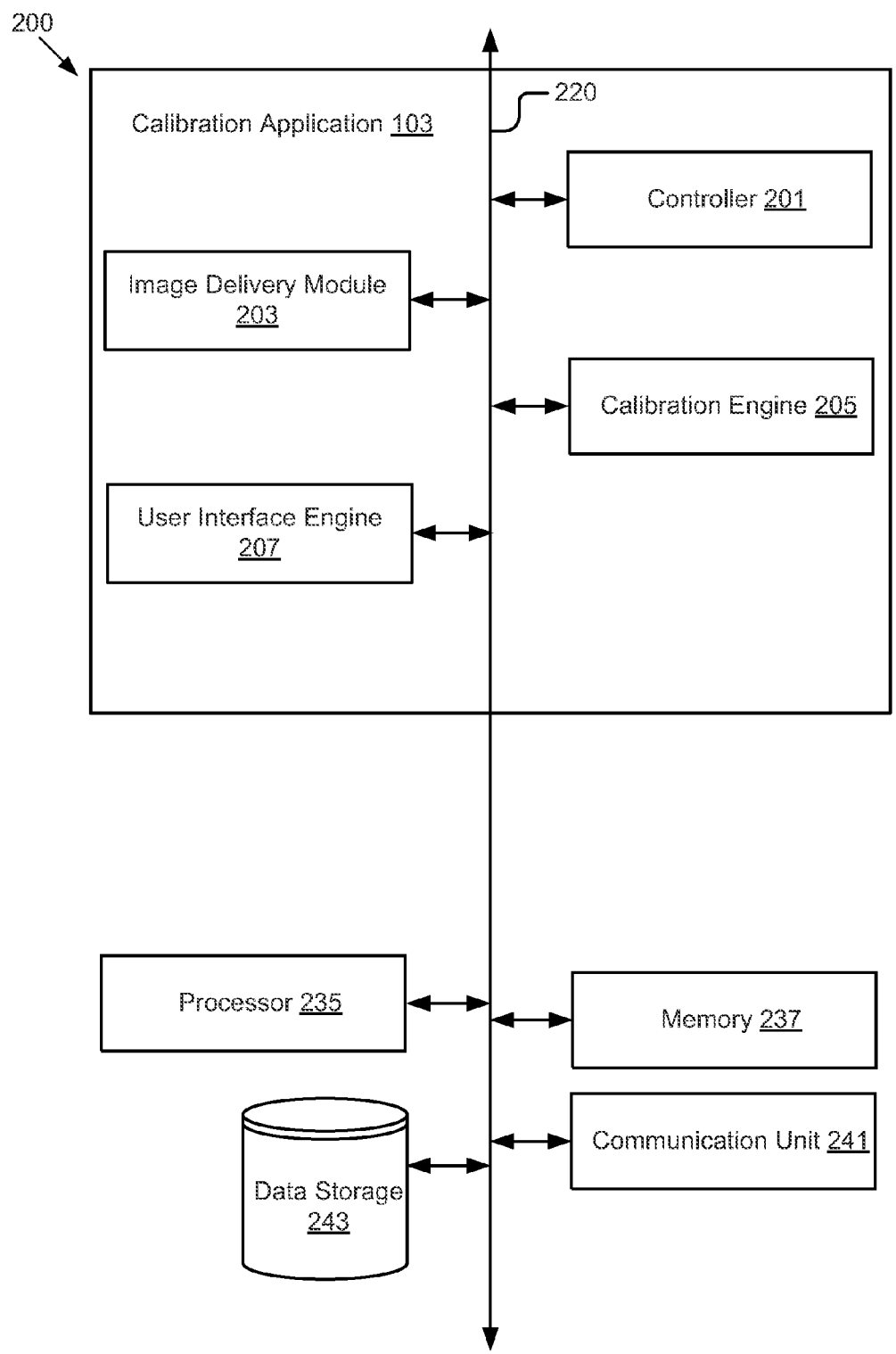
FIG. 2 is a block diagram illustrating one embodiment of a system having a calibration application.

Referring now to FIG. 2, an example of the calibration application 103 is shown in more detail. FIG. 2 is a block diagram of a computing device 200 that may include a calibration application 103, a processor 235, a memory 237, a communication unit 241, and data storage 243 according to some examples. The components of the computing device 200 are communicatively coupled by a bus 220. The bus 220 may represent one or more buses including an industry standard architecture (ISA) bus, a peripheral component interconnect (PCI) bus, a universal serial bus (USB), or some other bus known in the art to provide similar functionality. In some embodiments, the computing device 200 can be one of a human interface module 102, a computing and communication module 104, a backend service server 108, a positioning system 110 and other systems 112.

The processor 235 may execute software instructions by performing various input/output, logical, and/or mathematical operations. The processor 235 may have various computing architectures to process data signals including, for example, a complex instruction set computer (CISC) architecture, a reduced instruction set computer (RISC) architecture, and/or an architecture implementing a combination of instruction sets. The processor 235 may be physical and/or virtual, and may include a single processing unit or a plurality of processing units and/or cores. In some implementations, the processor 235 may be capable of generating and providing electronic display signals to a display device, supporting the display of images, capturing and transmitting images, performing complex tasks including various types of feature extraction and sampling, etc. in some implementations, the processor 235 may be coupled to the memory 237 via the bus 220 to access data and instructions therefrom and store data therein. The bus 220 may couple the processor 235 to the other components of the computing device 200 including, for example, the memory 237, the communication unit 241, the calibration application 103, and the data storage 243. It will be apparent to one skilled in the art that other processors, operating systems, sensors, displays and physical configurations are possible.

The memory 237 may store and provide access to data for the other components of the computing device 200. The memory 237 may be included in a single computing device or a plurality of computing devices as discussed elsewhere herein. In some implementations, the memory 237 may store instructions and/or data that may be executed by the processor 235. For example, in one embodiment, the memory 237 may store the calibration application 103. The memory 237 is also capable of storing other instructions and data, including, for example, an operating system, hardware drivers, other software applications, databases, etc. The memory 237 may be coupled to the bus 220 for communication with the processor 235 and the other components of computing device 200.

The memory 237 may include one or more non-transitory computer-usable (e.g., readable, writeable DRAM) device, a static random access memory (SRAM) device, an embedded memory device, a discrete memory device (e.g., a PROM, FPROM, ROM), a hard disk drive, an optical disk drive (CD, DVD, Blue-Ray™, etc.) mediums, which can be any tangible apparatus or device that can contain, store, communicate, propagate or transport instructions, data, computer programs, software, code, routines, etc., for processing by or in connection with the processor 235. In some implementations, the memory 237 may include one or snore of volatile memory and non-volatile memory. For example, the memory 237 may include, but is not limited, to one or more of a dynamic random access memory (DRAM) device, a static random access memory (SRAM) device, an embedded memory device, a discrete memory device (e.g., a PROM, FPROM, ROM), a hard disk drive, an optical disk drive (CD, DVD, Blue-Ray™, etc.). It should be understood that the memory 237 may be a single device or may include multiple types of devices and configurations.

The communication unit 241 is hardware for receiving and transmitting data by linking the processor 235 to the network 106 and other processing systems. The communication unit 241 receives data such as calibration requests from the human interface module 102 and transmits the requests to the controller 201, for example a request to adjust disparity for binocular display. The communication unit 241 also transmits information including digital information in a virtual plane to the human interface module 102 for display, for example, to align with a real-world object. The communication unit 241 is coupled to the bus 220. In one embodiment, the communication unit 241 may include a port for direct physical connection to the human interface module 102 or to another communication channel. For example, the communication unit 241 may include an RJ45 port or similar port for wired communication with the human interface module 102. In another embodiment, the communication unit 241 may include a wireless transceiver (not shown) for exchanging data with the human interface module 102 or any other communication channel using one or more wireless communication methods, such as IEEE 802.11, IEEE 802.16, Bluetooth® or another suitable wireless communication method.

In yet another embodiment, the communication unit 241 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 241 may include a wired port and a wireless transceiver. The communication unit 241 also provides other conventional connections to the network 106 for distribution of files and/or media objects using standard network protocols such as TCP/IP, HTTP, HTTPS and SMTP as will be understood to those skilled in the art.

The data storage 243 is a non-transitory memory that stores data for providing the functionality described herein. The data storage 243 may be a dynamic random access memory (DRAM) device, a static random access memory (SRAM) device, flash memory or some other memory devices. In some embodiments, the data storage 243 also may include a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment, the data storage 243 is communicatively coupled to the bus 220. In one embodiment, the data storage 243 stores the current position of the virtual object on the display of the human interface module 102. In another embodiment, the data storage 243 stores the depth-disparity calibration data and 2D positional calibration data collected for each of the set of depths. The data stored in the data storage 243 is described below in more detail. In one embodiment, the data storage 243 may store other data for providing the functionality described herein.

In one embodiment, the calibration application 103 may include a controller 201, an image delivery module 203, a calibration engine 205 and a user interface engine 207. The components of the calibration application 103 are communicatively coupled via the bus 220.

The controller 201 may include software and/or logic to control the operation of the other components of the calibration application 103. The controller 201 controls the other components of the calibration application 103 to perform the methods described below with reference to FIGS. 3-10. The controller 201 may also include software and/or logic to provide the functionality for handling communications between the calibration application 103 and other components of the computing device 200 as well as between the components of the calibration application 103. In some embodiments, the controller 201 can be implemented using hardware including a field-programmable gate array (FPGA) or an application-specific integrated circuit (ASIC). In some embodiments, the image delivery module 203 can be implemented using a combination of hardware and software executable by processor 235. In some embodiments, the controller 201 is a set of instructions executable by the processor 235. In some implementations, the controller 201 is stored in the memory 237 and is accessible and executable by the processor 235. In some implementations, the controller 201 is adapted for cooperation and communication with the processor 235, the memory 237 and other components of the calibration application 103 via the bus 220.

In one embodiment, the controller 201 sends and receives data, via the communication unit 241, to and from one or more of a human interface module 102, a computing and communication module 104, a backend service server 108, a positioning system 110 and other systems 112. For example, the controller 201 receives, via the communication unit 241, a virtual image from the backend service server 108 providing a service and sends the virtual image to the image delivery module 203. In another example, the controller 201 receives graphical data for providing a user interface including the virtual image to a user from the user interface engine 207 and sends the graphical data to the human interface module 102, causing the human interface module 102 to present the user interface including the virtual image to the user.

In one embodiment, the controller 201 receives data from other components of the calibration application 103 and stores the data in the data storage 243. For example, the controller 201 receives data including calibration information from the calibration engine 205 and stores the data in the data storage 243. In another embodiment, the controller 201 retrieves data from the data storage 243 and sends the data to other components of the calibration application 103. For example, the controller 201 retrieves data including virtual information from the data storage 243 and sends the retrieved data to the calibration engine 205.

The image delivery module 203 may include software and/or logic to provide the functionality for displaying digital information including a virtual object on a display of the human interface module 102 so that it appears as if positioned on a virtual image plane or multiple virtual image planes. In some embodiments, the image delivery module 203 can be implemented using hardware including a field-programmable gate array (FPGA) or an application-specific integrated circuit (ASIC). In some embodiments, the image delivery module 203 can be implemented using a combination of hardware and software executable by processor 235. In some embodiments, the image delivery module 203 is a set of instructions executable by the processor 235. In some implementations, the image delivery module 203 is stored in the memory 237 and is accessible and executable by the processor 235. In some implementations, the image delivery module 203 is adapted for cooperation and communication with the processor 235, the memory 237 and other components of the calibration application 103 via the bus 220.

In one embodiment, the image delivery module 203 receives or generates optical information including virtual object data and the controller 201 instructs the user interface engine 207 to produce the image for presentation on the display of the human interface module 102. In one embodiment, the image delivery module 203 retrieves the virtual object data entirely from the backend service server 108, entirely from the computing and communication module 104, or cooperatively from both of them. For example, the virtual object data can be a representation of a crosshair for calibration purposes. In another example, the virtual object data may be a bank customer profile data that can be superimposed on a corresponding real life bank customer.

In one embodiment, the image delivery module 203 receives instructions from the user interface engine 207 relating to the current position of the virtual object on the display of the human interface module 102. In one embodiment, the image delivery module 203 sends the information including the current position of the virtual object to the calibration engine 205. In another embodiment, the image delivery module 203 stores the information in the data storage 243.

The calibration engine 205 may include software and/or logic to provide the functionality for performing calibration based on user input about a virtual object rendered on the display such that it appears overlaid or superimposed with a real-world object to the user when viewed through the human interface module 102. The functionality and operation of the calibration engine 205 is described in more detail below and with reference to FIGS. 3-10. In some embodiments, the calibration engine 205 can be implemented using hardware including a field-programmable gate array (FPGA) or an application-specific integrated circuit (ASIC). In some embodiments, the calibration engine 205 can be implemented using a combination of hardware and software executable by processor 235. In some embodiments, the calibration engine 205 is a set of instructions executable by the processor 235. In some implementations, the calibration engine 205 is stored in the memory 237 and is accessible and executable by the processor 235. In some implementations, the calibration engine 205 is adapted for cooperation and communication with the processor 235, the memory 237 and other components of the calibration application 103 via the bus 220.

In one embodiment, the calibration engine 205 determines a set of depths for placing a real-world object from the display of the human interface module 102. The calibration engine 205 performs calibration based on user input at each depth from the set of depths. For example, the calibration engine 205 may initiate a calibration procedure at a low distance/depth (0.5 meters or 2 diopter), a mid-distance/depth (2.75 meters or 0.3636 diopter), and a far distance/depth (5 meters or 0.2 diopter) that the real-world object placed from the display of the human interface module 102. In one embodiment, the display of the human interface module 102 can be a single focal plane display. In another embodiment, the display of the human interface module 102 can be a multi-focal plane display.

In some embodiments, the calibration engine 205 determines a depth of a real-world object from the eye of the user. In one embodiment, the calibration engine 205 receives a captured image of a real-world scene including a real-world object that is of interest, for example, a black and white patterned fiducial marker identifying a real-world object in a scene, etc. The calibration engine 205 determines a depth map for the captured image. The depth map may include information relating to the distance of the surface of the real-world object from a viewpoint of the eyes of the user. For example, the position (e.g., X1, Y1 and Z1) of the real-world object in the real-world scene can be described using three dimensional coordinate system as can the eye position (e.g., X2, Y2 and Z2) on that same coordinate system. If the origin for the Z value is at the eye of the user and the Z axis of the coordinate system is along a line pointing directly between the eye of the user and the real-world object, then the depth is the distance along the Z axis between the eye of the user and the real-world object (e.g., Z1-Z2). In another embodiment, the calibration engine 205 is coupled to receive a depth value for the distance between the eye of the user and the real-world object from a depth sensor associated with the human interface module 102. The depth sensor may be part of the human interface module 102 or part of another system 112.

In some embodiments, the calibration engine 205 performs calibration for rendering a virtual object on the display of the human interface module 102 at each depth from the set of depths where the real-world object can be perceived by the user. In another embodiment, the calibration engine 205 receives user input to perform calibration for rendering a virtual object on the display at one or more depths of the real-world object. The real-world object may be placed at different depths away from the display by the user using a physical distance measurement tool. For example, the user may place the real-world object away from the display at each one of a first, low distance/depth (0.5 meters or 2 diopter), a second, mid distance/depth (2.75 meters or 0.3636 diopter), and a third, far distance/depth (5 meters or 0.2 diopter). The calibration application 103, in particular the image delivery module 203 and the user interface module 207 cause the virtual object to be displayed on the display of the human interface module 102 overlaid on an image scene including the real world object. The virtual object is rendered such that the virtual object appears positioned at the perceived depth of the real-world object and associated with the real-world object based on the user input. The virtual object may be considered overlaid or super imposed over the image scene including the real world object.

In one embodiment, the calibration engine 205 performs a depth-disparity calibration based on user input to determine disparity given the depth of the real-world object from the display. In the general case, disparity is defined as an offset to a reference point as will be explained below with reference to FIG. 10. While the reference point will be generally assumed to be in the center of the screen for the discussions below, it should be understood that in other embodiments the reference point could be anywhere on the screen. For example, disparity can include a number of different types including but not limited to binocular disparity, retinal disparity, total eye disparity, retinal disparity for the left eye, retinal disparity for the right eye, screen disparity, total screen disparity, screen disparity for the left eye, screen disparity for the right eye left, etc. These different types of disparity can be best understood with reference to FIG. 10 and the description provided below. The screen disparity for the display can be measured, for example, in pixels, sub-pixels, ratio relative to the screen size, visual angle, etc. In one embodiment, the calibration engine 205 performs depth-disparity calibration at one or more depths to determine a mapping relationship between the depth and screen disparity parameters for a particular user. This is because the virtual image plane where the virtual object is perceived may be at a different depth/distance than that of the real-world object. The technique of positioning the virtual object on the display relative to the real-world object as perceived by the user through the display of the human interface module 102 is based on the mapping between the depth parameter and the screen disparity parameter. In one embodiment, the virtual object is positioned on the display so that it appears overlaid on top of the real-world object and the user's eyes converge to the depth of the real-world object and perceive the virtual object as being associated with the real-world object based on the mapping between the depth parameter and the screen disparity parameter.

Figure 10:
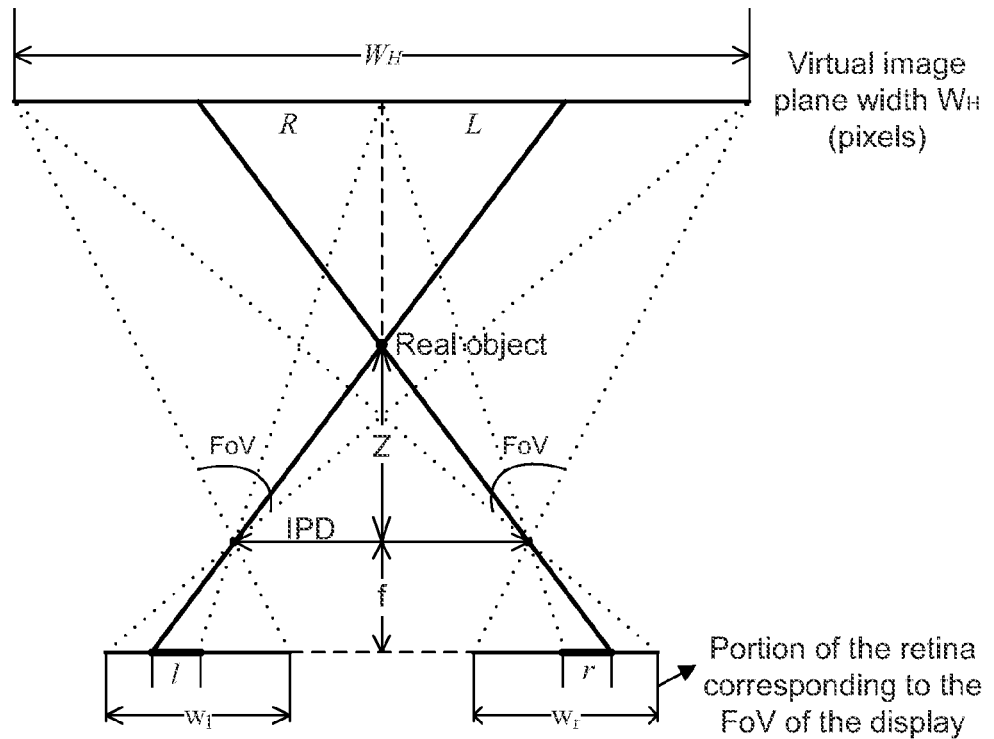
FIG. 10 is a diagram of one embodiment of a two-eye geometry showing an image plane, a real world object and disparities.

Referring now also to FIG. 10, the relationship between depth and different disparity parameters will be described. In one embodiment, a relationship between the depth and different disparity parameters modeled using a pinhole camera model can be formally stated as:

$$\frac{Z}{IPD} = \frac{Z+f}{IPD+l+r}$$

where Z denotes the depth of the real-world object, IPD denotes inter-pupillary distance, l denotes the retinal disparity of the target or reference point on the left eye, r denotes the retinal disparity of the target or reference point on the right eye, and f denotes the focal length of the eyes. If total eye disparity can be defined as $\delta = l+r$, then it is understood that $$\delta = \frac{IPD \times f}{Z}$$

In one embodiment, the total screen disparity d for a binocular optical see-through display can be defined as $d = L+R$, where L is the screen disparity for the left eye and R is the screen disparity for the right eye. In FIG. 10, if r denotes the retinal disparity for the right eye, l denotes the retinal disparity for the left eye, $W_H$ denotes the virtual image plane width (e.g., in pixels), $w_l$ and $w_r$ denote the width of the portion of the left eye retina and the right eye retina, respectively, corresponding to the field of view (FoV) of the binocular optical see-through display, then the relationship among these factors for the binocular optical see-through display can be stated as:

$$\frac{w_l}{W_H} = \frac{w_r}{W_H} = \frac{l}{L} = \frac{r}{R}, \text{ and}$$

$$\frac{w_l}{2f} = \tan\left(\frac{FoV}{2}\right)$$

From the pinhole camera model derivation, $$\delta = l + r = \frac{IPD \times f}{Z},$$

the derivation for total screen disparity of binocular optical see-through display can be stated as:

$$d = L + R = \frac{W_H \times l}{w_l} + \frac{W_H \times r}{w_l} = \frac{W_H \delta}{2f \tan\left(\frac{FoV}{2}\right)} = \frac{W_H \times IPD}{2\tan\left(\frac{FoV}{2}\right) \times Z} = \frac{C}{Z}$$

$$\text{where } C = \frac{W_H \times IPD}{2\tan\left(\frac{FoV}{2}\right)}$$

is a constant.

In one embodiment, the value of constant C may deviate from the calculated value based on one or more factors that affect the perceived depth of human eyes via the see-through display and thus it would be beneficial to provide a depth-disparity calibration based on the user input to determine the mapping for a particular user.

In one embodiment, the calibration engine 205 receives calibration data for depth-disparity calibration at a number of depths (e.g., trials) and applies a regression algorithm for mapping a relationship between the depth and disparity parameters. For example, the calibration engine 205 may perform analysis on the calibration data using linear least square regression, ordinary least square regression, mean squared error, etc. In one embodiment, the calibration engine 205 may produce a mapping between the depth and the disparity that is linear. For example, when the calibration engine 205 applies a linear regression on the calibration data and the mapping corresponds to a linear mapping. In one embodiment, the slope of the mapping for a first user's calibration data may correspond to the constant C. In another embodiment, the calibration engine 205 can then estimate the value of constant C for a second user by using the inter-pupillary distance of the second user thereby eliminating per user calibration.

In one embodiment, the calibration engine 205 performs 2D positional calibration based on user input to determine a screen pixel coordinate on the display where the virtual object can be perceived as superimposed on, or otherwise associated with, the real-world object to the user's eyes. In one embodiment, the calibration engine 205 performs 2D positional calibration at one or more depths to determine a mapping relationship between 3D coordinates of the real-world object and 2D screen pixel coordinates on the display where the virtual object can be positioned for a particular user. In one embodiment, the calibration engine 205 may acquire the 3D coordinates of the real-world object in the real-world scene via a depth sensor (e.g., time of flight, structure light, plenoptic camera, laser range finder, etc.) or via a traditional camera. In some embodiments, the real-world object may include detectable features (e.g., a black and white patterned fiducial marker) to increase accuracy of acquiring the 3D coordinates.

In one embodiment, the correspondence mapping between the 2D screen pixel coordinates and the 3D real-world object coordinates for human eyes modeled as a camera can be formally stated as:

$$s \begin{bmatrix} u \\ v \\ 1 \end{bmatrix} = \begin{bmatrix} f_x & 0 & c_x \\ 0 & f_y & c_y \\ 0 & 0 & 1 \end{bmatrix} [R|t] \begin{bmatrix} X \\ Y \\ Z \\ 1 \end{bmatrix},$$

$$\text{where } [R|t] = \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix}$$

where (X, Y, Z) are the coordinates of the 3D real-world object point in the real-world scene, s is the scaling factor, (u, v) are the pixel screen coordinates of the rendered virtual object on the display of the human interface module 102, ($f_x$, $f_y$) are the focal lengths (horizontal and vertical) of eyes expressed in pixel units, ($c_x$, $c_y$) is the principal or reference point at the image center, and [R|t] is the joint rotation-translation matrix transforming a 3D point coordinates to the 2D screen pixel coordinates.

In one embodiment, the calibration engine 205 receives calibration data for 2D positional calibration at a number of depths (e.g., trials) and applies a regression algorithm for mapping a relationship between the 3D coordinates of the real-world object and 2D screen pixel coordinates on the display. For example, the calibration engine 205 may perform analysis on the calibration data using the Levenberg-Marquardt optimization algorithm, the Nelder-Mead optimization algorithm, etc.

In one embodiment, the calibration engine 205 performs a depth-disparity calibration procedure for the paired eyes of the user. The depth-disparity calibration for the paired eyes starts with the real-world object placed at a first depth of a set of varying depths from the eyes of the user. In one embodiment, the user focuses on the real-world object during the depth-disparity calibration procedure.

In one embodiment, the calibration engine 205 receives user input confirming that a virtual object is displayed in stereoscopic view of the display with a certain binocular screen disparity value. The calibration engine 205 receives user input to move the virtual object on the display until it falls within an area of fused stereo vision of the user and determines a binocular screen disparity value for viewing the virtual object on the display based on the user input. The area of fused stereo vision can be defined as the area where the user's brain interprets disparate images seen by the two eyes as being the same object and perceives the depth of the object. This area of fused stereo vision may be referred to as Panum's fusional area. When the binocular disparity value is too large or too small, the user may experience double vision where the brain cannot fuse the disparate images in the two eyes. In one embodiment, the calibration engine 205 receives user input to move the virtual object within the area of fused stereo vision of the user. The virtual object is moved to align in depth with the real-world object within the area of fused stereo vision on the display. In one embodiment, the calibration engine 205 determines whether the calibration is complete (e.g., the user sees a virtual object aligned in depth with the real-world object). If the calibration is determined incomplete, the calibration engine 205 continues to receive user input for further calibration. In one embodiment, the calibration engine 205 repeats the depth-disparity calibration procedure for other depths from the set of depths and stores the calibration data, the binocular disparity values, collected for each of the set of depths in the data storage 243. In another embodiment, the calibration engine 205 determines a mapping between the depth and the binocular screen disparity based on the calibration data collected for each of the set of depths.

In another embodiment, the calibration engine 205 performs a separate eye depth-disparity calibration procedure using separate eyes of the user serially. The depth-disparity calibration for separate eyes starts with the real-world object placed at a first depth, of a set of varying depths, from the eyes of the user. In one embodiment, the calibration engine 205 receives user input confirming that a virtual object is displayed with a certain disparity value.

In one embodiment, the calibration engine 205 receives user input to move the virtual object on the display to align 2D screen position of the virtual object with the real-world object using the left eye of the user, while the right eye of the user is closed or occluded. In one embodiment, the calibration engine 205 determines whether the 2D position adjustment based on user input using the left eye is complete (e.g., the virtual object aligns with the real-world object). The position adjustment based using the left eye can be determined as completed by the calibration application 103 or based on input from the user. If the 2D position adjustment is determined incomplete, the calibration engine 205 continues to receive user input for further alignment adjustment, until it is determined to be complete or reaches a time limit threshold of the calibration application 103. As a second part of the separate eye depth-disparity calibration, the calibration engine 205 receives user input to move the virtual object on the display at the first depth to determine a screen disparity value for viewing the virtual object using the right eye of the user, while the left eye of the user is closed or occluded. The user input is used to adjust the screen disparity of a virtual target so that the viewer sees the same image with for both eyes. In one embodiment, the calibration engine 205 determines whether the disparity adjustment based on the user input using the right eye is complete (e.g., the virtual object aligns with the real-world object as seen by the two eyes separately). Like the position adjustment, the disparity adjustment using only the right eye can be determined as completed by the calibration application 103 or based on input from the user. If the disparity adjustment based on user input using the right eye is complete as determined by the calibration application 103 or based on input from the user, the calibration engine 205 determines a screen disparity. If the disparity adjustment is determined incomplete, the calibration engine 205 continues to receive user input for further disparity adjustment, until it is determined to be complete or reaches a time limit threshold of the calibration application 103. In one embodiment, the calibration engine 205 repeats the depth-disparity calibration procedure for other depths from the set of depths and stores the calibration data, disparity values, collected for the set of depths in the data storage 243. In another embodiment, the calibration engine 205 determines a mapping between the depth and the screen disparity based on the calibration data collected for each of the set of depths. While the above process has been described as determining screen position using the left eye and determining the screen disparity using the right eye, it should be understood that the screen position could be determined using the right eye and screen disparity using the left eye. Moreover, different eyes or combinations thereof could be used at different depths for determining screen position and determining the screen disparity. Thus there are a variety of orders based on right, left and depth contemplated by the present methods that may be mixed so long as the information for the same depths is later paired and used for mapping.

In one embodiment, the calibration engine 205 performs a joint 3D calibration procedure. The joint 3D calibration procedure may include: 1) depth-disparity calibration, and 2) 2D positional calibration. For example, the calibration engine 205 receives user input to move the virtual object on the display of the human interface module 102 to determine disparity for rendering the virtual object and to align the 2D position of the virtual object on the display such that the virtual object is aligned in position and depth with the real-world object. It should be understood that there are two embodiments of the joint 3D calibration procedure. A first embodiment performs depth-disparity calibration first, then performs 2D positional calibration. During the 2D positional calibration, the calibrated disparities from the first depth-disparity calibration step can be used to render the virtual object at the corresponding depth. A second embodiment performs 2D positional calibration and depth-disparity calibration jointly at the same time. It should be understood that other embodiments not described here may perform depth-disparity calibration and 2D positional calibration in a different order.

In the first embodiment, the calibration engine 205 performs the joint 3D calibration procedure by first determining depth-disparity calibration and then using the calibrated disparities from the depth-disparity calibration to render the virtual object at the corresponding depth during 2D positional mapping. The first embodiment of joint 3D calibration procedure uses the paired eyes of the user. The joint 3D calibration for paired eyes starts with the real-world object placed at a first depth, of a set of varying depths, from the eyes of the user. In one embodiment, the user focuses on the real-world object during the joint 3D calibration.

In the first embodiment of the joint 3D calibration procedure, the calibration engine 205 first performs depth-disparity calibration by determining a depth disparity. The calibration engine 205 then uses the mapped disparity from the depth-disparity calibration to render the virtual target at the right depth. The calibration engine 205 then receives user input to move the virtual object on the display to align the 2D pixel position of the virtual object on the display with the real-world object. In one embodiment, the calibration engine 205 determines whether the calibration is complete (e.g., the user sees that the virtual object is aligned in depth and position with the real-world object). If the calibration is complete disparity value is stored or recorded along with the depth. As noted above, the calibration can be determined as completed by the calibration application 103 or based on input from the user. If the calibration is determined incomplete, the calibration engine 205 continues to receive user input for further calibration. In one embodiment, the calibration engine 205 repeats the joint 3D calibration procedure for other depths from the set of depths and stores the calibration data collected for each of the set of depths in the data storage 243. In another embodiment, the calibration engine 205 determines a first mapping between the depth and the disparity value and a second mapping between 3D coordinates of the real-world object and 2D screen pixel coordinates on the display based on the calibration data collected for each of the set of depths.

In the second embodiment of the joint 3D calibration procedure, the calibration engine 205 performs the joint 3D calibration procedure by determining 2D positional calibration and depth-disparity calibration jointly. This alternatively can be described as a joint 3D calibration procedure using separate eyes of the user. The joint 3D calibration for separate eyes starts with the real-world object placed at a first depth, of a set of varying depths, from the display of the human interface module 102. In this embodiment, the calibration engine 205 receives user input to move the virtual object on the display to first align the 2D screen pixel position of the virtual object with the real-world object using the left eye of the user, while the right eye of the user is closed or occluded. The calibration engine 205 then receives user input to move the virtual object on the display at the first depth to determine a disparity value for rendering the virtual object on the display using the left eye of the user, while the right eye of the user is closed or occluded. In one embodiment, the calibration engine 205 determines whether the calibration using the left eye is complete (e.g., the user sees that the virtual object is aligned in depth and position with the real-world object). As noted above, the calibration can be determined as completed by the calibration application 103 or based on input from the user. In this and other methods the determination of whether calibration is complete can be determined solely on user input alone. If the calibration using the left eye is determined to be incomplete, the calibration engine 205 continues to receive user input for further calibration, until it is determined to be complete or reaches a time limit threshold of the calibration application 103. The calibration information determined for the left eye in the above steps can be stored for later use. In particular, the left eye data is used in some embodiments to perform 2D calibration regression as will be described in more detail below. As a second part of the joint 3D calibration for separate eyes, the calibration engine 205 receives user input to move the virtual object on the display to first align the 2D screen pixel position of the virtual object with the real-world object using the right eye of the user, while the left eye of the user is closed or occluded. The calibration engine 205 then receives user input to move the virtual object on the display at the first depth to determine a disparity value for rendering the virtual object on the display using the right of the user, while the left eye of the user is closed or occluded. In one embodiment, the calibration engine 205 determines whether the calibration using the right eye is complete (e.g., the user sees that the virtual object is aligned in depth and position with the real-world object). As noted above, the calibration can be determined as completed by the calibration application 103 or based on input from the user. If the calibration using the right eye is determined to be incomplete, the calibration engine 205 continues to receive user input for further calibration, until it is determined to be complete or reaches a time limit threshold of the calibration application 103. The calibration information determined for the right eye in the above steps can be stored for later use. In particular, the right eye data is used in some embodiments to perform 3D calibration regression as will be described in more detail below. In one embodiment, the calibration engine 205 repeats the joint 3D calibration procedure for other depths from the set of depths and stores the calibration data collected for each of the set of depths in the data storage 243. In another embodiment, the calibration engine 205 determines a first mapping between the depth and the disparity and a second mapping between 3D coordinates of the real-world object and 2D screen pixel coordinates on the display based on the calibration data collected for each of the set of depths.

In one embodiment, the calibration engine 205 sends instructions to the user interface engine 207 to move the virtual target on the user interface of the human interface module 102 based on the user input.

The user interface engine 207 may include software and/or logic for providing user interfaces to users. In some embodiments, the user interface engine 207 can be implemented using hardware including a field-programmable gate array (FPGA) or an application-specific integrated circuit (ASIC). In some embodiments, the user interface engine 207 can be implemented using a combination of hardware and software executable by processor 235. In some embodiments, the user interface engine 207 is a set of instructions executable by the processor 235. In some implementations, the user interface engine 207 is stored in the memory 237 and is accessible and executable by the processor 235. In some implementations, the user interface engine 207 is adapted for cooperation and communication with the processor 235, the memory 237 and other components of the calibration application 103 via the bus 220.

In one embodiment, the user interface engine 207 receives instructions from the image delivery module 203 to generate a graphical interface that depicts the virtual object (or an image of the virtual object) on the display of the human interface module 102. In another embodiment, responsive to a user of a human interface module 102 providing calibration input to move the virtual object and indicate alignment, the user interface engine 207 receives the current position of the virtual object from the image delivery module 203. The user interface engine 207 generates a graphical interface for moving the virtual object to the new position based on the user calibration input. The user interface engine 207 sends the graphical data to the display of the human interface module 102 via the communication unit 241 causing the display to show the virtual object movement and alignment.

Figure 3:
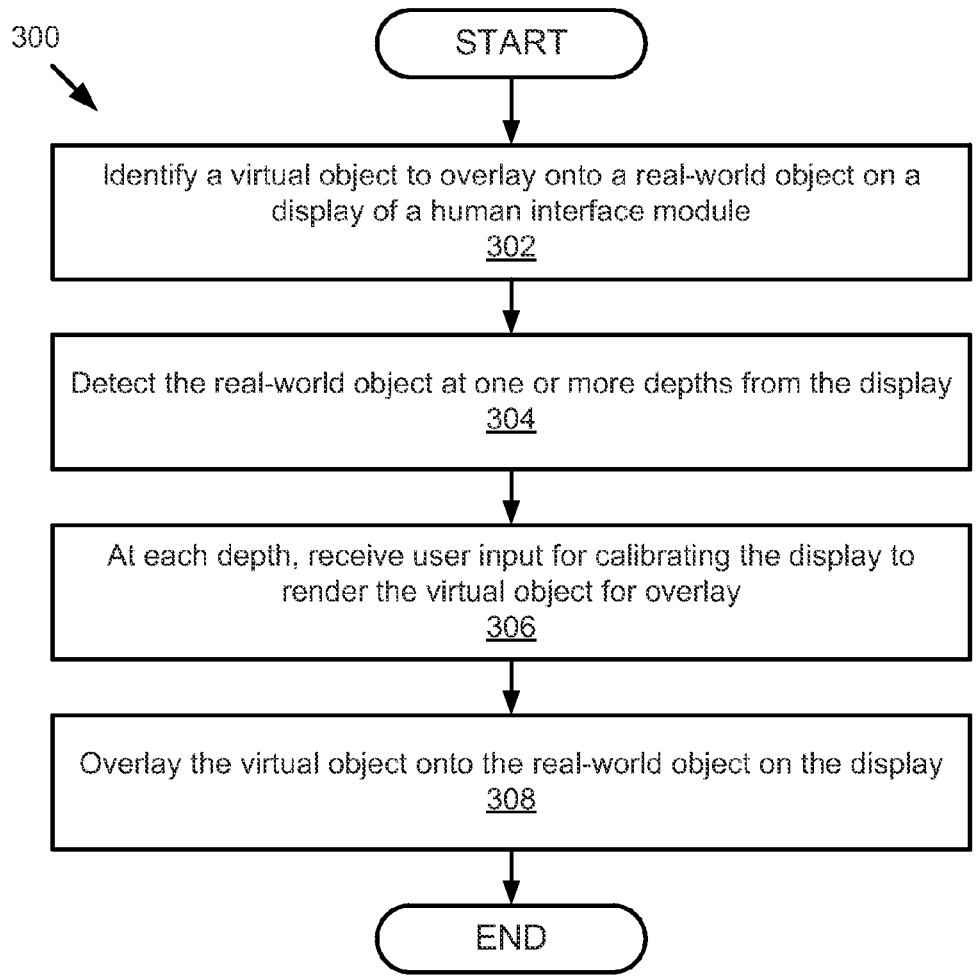
FIG. 3 is a flow diagram illustrating one embodiment of a calibration method.

FIG. 3 is a flow diagram of one embodiment of a method 300 for calibration. The calibration application 103 may include a controller 201, an image delivery module 203, a calibration engine 205, and a user interface engine 207. At 302, the image delivery module 203 identifies a virtual object to overlay onto a real-world object on a display of a human interface module 102. For example, the virtual object (or image of a virtual object) can be a crosshair, a circular dot, or other image. In another example, the real-world object may include a black and white patterned fiducial marker identifying the real-world object. As used in this method and others below when the "virtual object is overlaid onto a real-world object on a display of a human interface module 102" this refers generally to calibration application 103 rendering a virtual object on a display of a human interface module 102 positioned relative to a real world object. At 304, the calibration engine 205 detects the real-world object at one or more depths from the display. In other embodiments, the calibration engine 205 may receive a depth of the real-world object from various external sensors, such as a depth sensor, or from a user. In one embodiment, the display can be a single focal plane display or a multi-focal plane display. At 306, for each depth, the calibration engine 205 receives user input for calibrating the display to render the virtual object for overlay. The user input may be received, for example, through the user interface engine 207. For example, the user input for calibrating the display can be used to determine a size, a depth, and a position of the virtual object for rendering on the display of the human interface module 102. At 308, the calibration engine 205 overlays the virtual object onto the real-world object on the display. For example, the virtual object is overlaid on top of (or in some other relation to) the real-world object on the display to associate the virtual object with the real-world object. It should be understood that steps of this process may be performed repeated and iteratively until calibration is complete.

Figure 4:
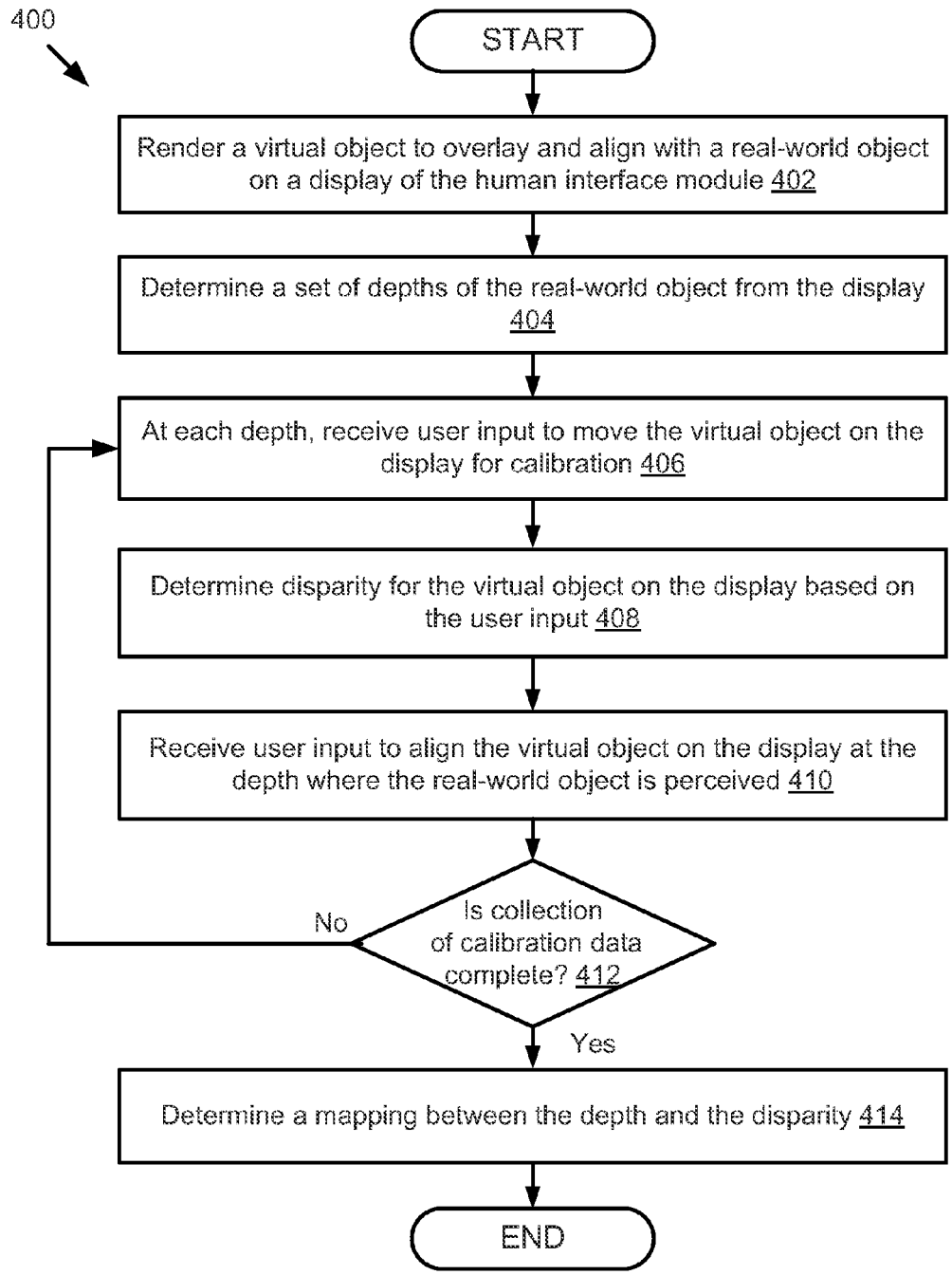
FIG. 4 is a flow diagram illustrating one embodiment of a depth-disparity calibration method.

FIG. 4 is a flow diagram of one embodiment of a method 400 for depth-disparity calibration. The calibration application 103 may include a controller 201, an image delivery module 203, a calibration engine 205, and a user interface engine 207. At 402, the image delivery module 203 renders a virtual object to overlay and align it with a real-world object on a display of the human interface module 102. At 402, the calibration engine 205 determines a set of depths of the real-world object from the display. In various embodiments, the set of depths may be any number greater than one. As noted above, one embodiment includes a set of three depths. In other embodiments, the calibration engine 205 may receive a depth of the real-world object from various external sensors, such as a depth sensor, or from a user. For example, the calibration engine 205 determines a depth map from a captured image of the real-world object. The depth map may include information relating to the distance of the surface of the real-world object from a viewpoint of the display of the human interface module 102. At 406, for each depth, the calibration engine 205 receives user input to move the virtual object on the display for calibration, and at 408, determines disparity for the virtual object on the display based on the user input. As noted above, the disparity is offset to a reference point in screen pixels. The reference point is generally assumed to be in the center of the screen, but it could be anywhere on the screen in other embodiments. The user input may be received, for example, through the user interface engine 207. For example, the disparity is a binocular disparity or the offset between the object point locations as seen by the left eye and the right eye of the user. At 410, the calibration engine 205 receives user input to align the virtual object on the display at the depth where the real-world object is perceived. At 412, the calibration engine 205 checks whether the collection of calibration data is complete (e.g., the user sees the virtual object is aligned in depth with the real-world object). Completion can be based on user input alone, calibration application 103 signals or a combination of both. If the collection of calibration data is complete, at 414, the calibration engine 205 determines a mapping between the depth and the disparity. For example, the calibration engine 205 may perform analysis on the calibration data using a linear least square regression algorithm and determine a mapping between the depth and the disparity. If the collection of calibration data is incomplete, the calibration engine 205 repeats the process of 406 through 410.

Figure 5:
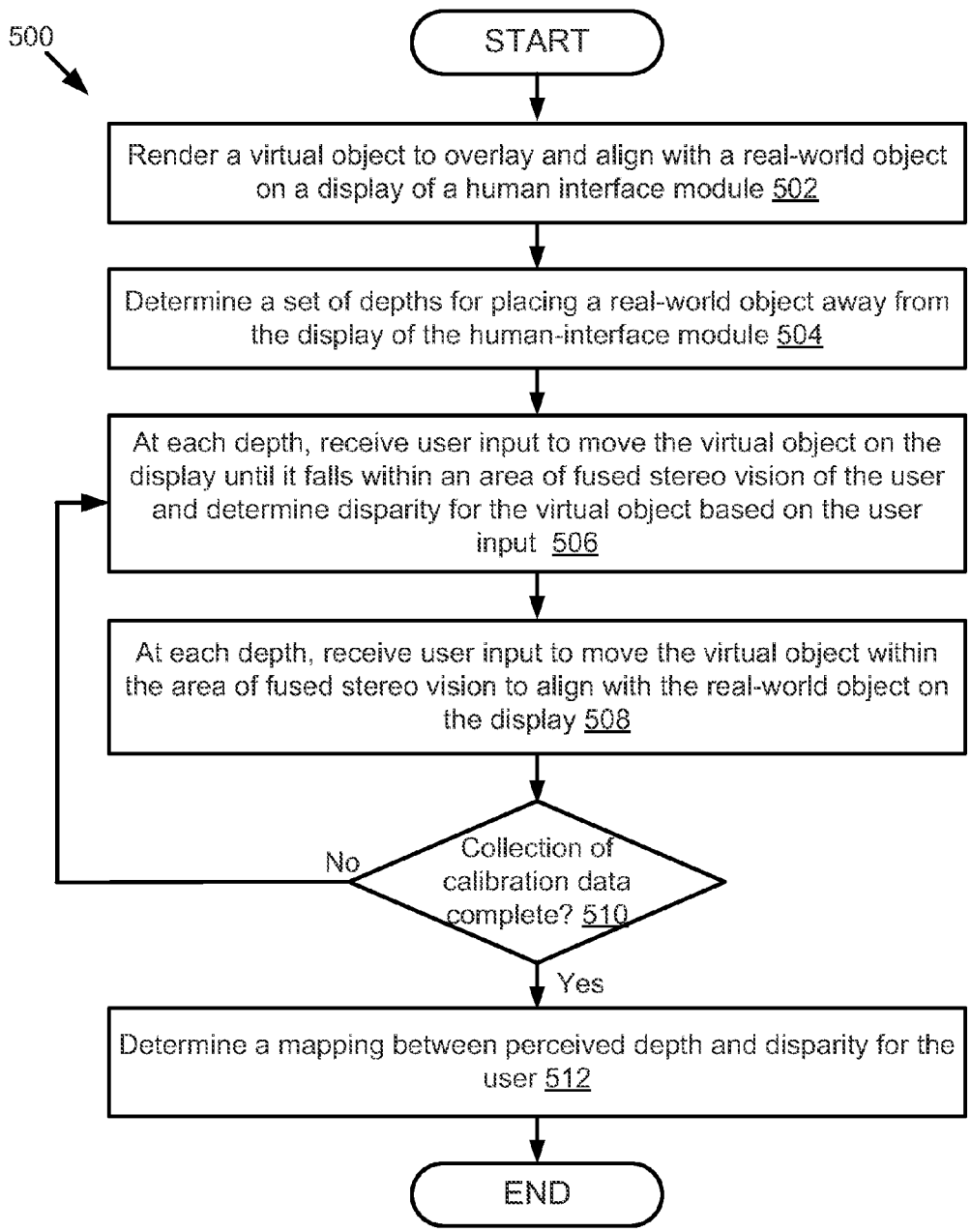
FIG. 5 is a flow diagram illustrating one embodiment of a depth-disparity calibration method using paired eyes.

FIG. 5 is a flow diagram of one embodiment of a method 500 for depth-disparity calibration using paired eyes. The calibration application 103 may include a controller 201, an image delivery module 203, a calibration engine 205, and a user interface engine 207. At 502, the image delivery module 203 renders a virtual object to overlay and align with a real-world object on a display of a human interface module 102. At 504, the calibration engine 205 determines a set of depths for placing a real-world object away from the eyes of the user. For example, the depth of the real-world object can be one of a low distance/depth (0.5 meters or 2 diopter), a mid distance/depth (2.75 meters or 0.3636 diopter), and a far distance/depth (5 meters or 0.2 diopter). At 506, for each depth, the calibration engine 205 receives user input to move the virtual object on the display until it falls within an area of fused stereo vision of the user and determines disparity for the virtual object based on the user input. The user input may be received, for example, through the user interface engine 207. The area of fused stereo vision can be defined as the area where the user's brain interprets disparate images seen by the two eyes as being the same object and perceives the depth of the object. This area of fused (single) stereo vision may be referred to as Panum's fusional area. At 508, for each depth, the calibration engine 205 receives user input to move the virtual object within the area of fused stereo vision to align with the real-world object on the display. At 510, the calibration engine 205 checks whether the collection of calibration data is complete (e.g., the user sees that the virtual object is aligned in depth with the real-world object). If the collection of calibration is data complete, at 512, the calibration engine 205 determines a mapping between the depth and the disparity. If the collection of calibration data is incomplete, the calibration engine 205 repeats the process of 506 through 508.

Figure 6:
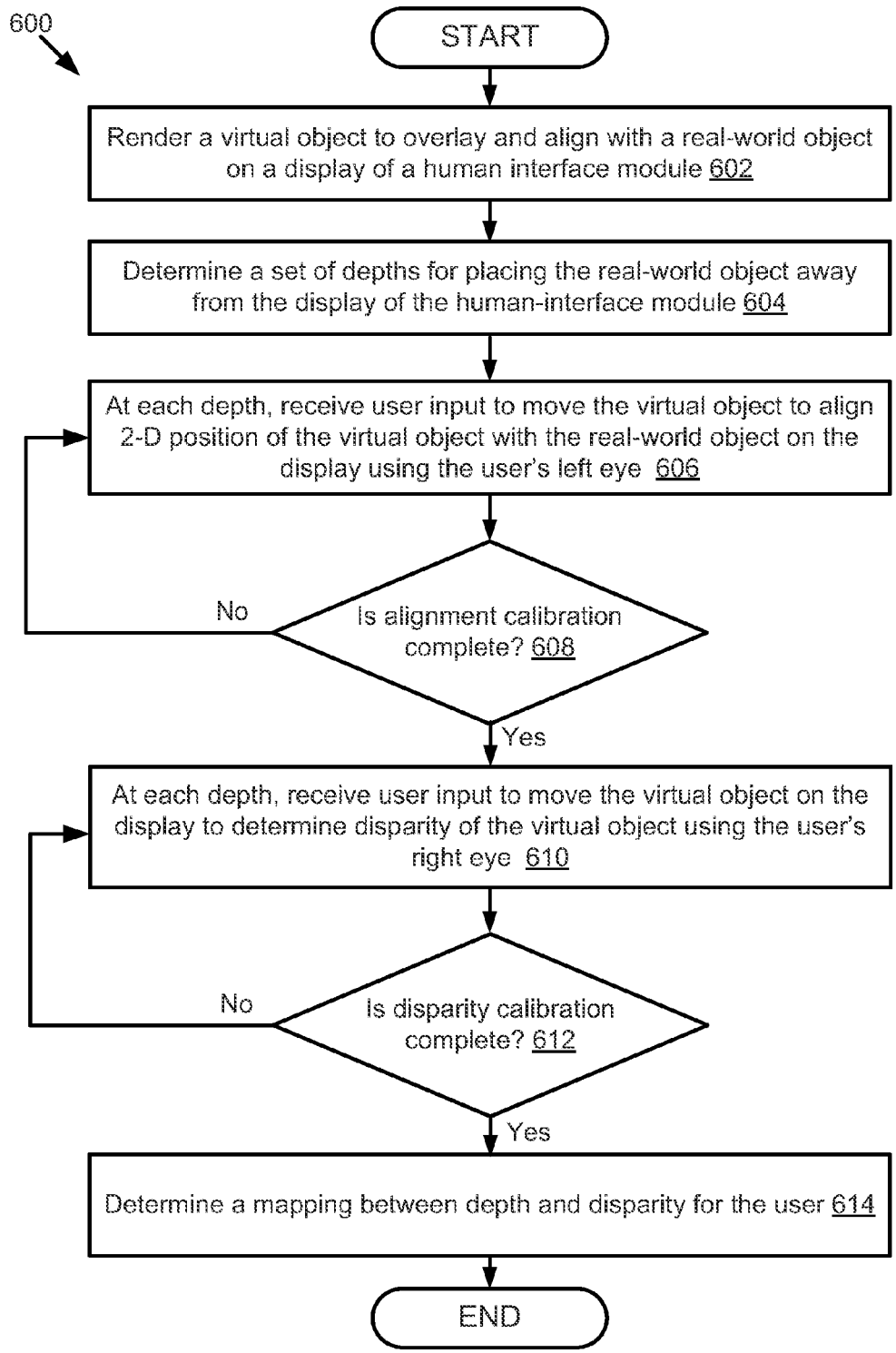
FIG. 6 is a flow diagram illustrating one embodiment of a depth calibration method using separate eyes.

FIG. 6 is a flow diagram of one embodiment of a method 600 for depth-disparity calibration using "separate eyes." The calibration application 103 may include a controller 201, an image delivery module 203, a calibration engine 205, and a user interface engine 207. At 602, the image delivery module 203 renders a virtual object to overlay and align with a real-world object on a display of a human interface module 102. At 604, the calibration engine 205 determines a set of depths for placing the real-world object away from the eyes of the user. In one embodiment, the real-world object may be placed at different depths away from the display by the user using a physical distance measurement tool. At 606, for each depth, the calibration engine 205 receives user input to move the virtual object to align the 2D position of the virtual object with the real-world object on the display using the user's left eye. The user input may be received, for example, through the user interface engine 207. At 608, the calibration engine 205 checks whether alignment calibration is complete (e.g., the user sees that the virtual object is aligned with the real-world object). If the alignment calibration is incomplete, the calibration engine 205 repeats the process 606. If the alignment calibration is complete, at 610, for each depth, the calibration engine 205 receives user input to move the virtual object on the display to determine a screen disparity value of the virtual object using the user's right eye. In other words, the right eye is used to move the virtual object to adjust screen disparity so the user sees the same images in both eyes. At 612, the calibration engine 205 checks whether disparity calibration is complete (e.g., the user sees that the virtual object is aligned with the real-world object). If the disparity calibration is incomplete, the calibration engine 205 repeats the process 610. If the disparity calibration is complete, at 614, the calibration engine 205 determines a mapping between depth and disparity for the user.

Figure 7:
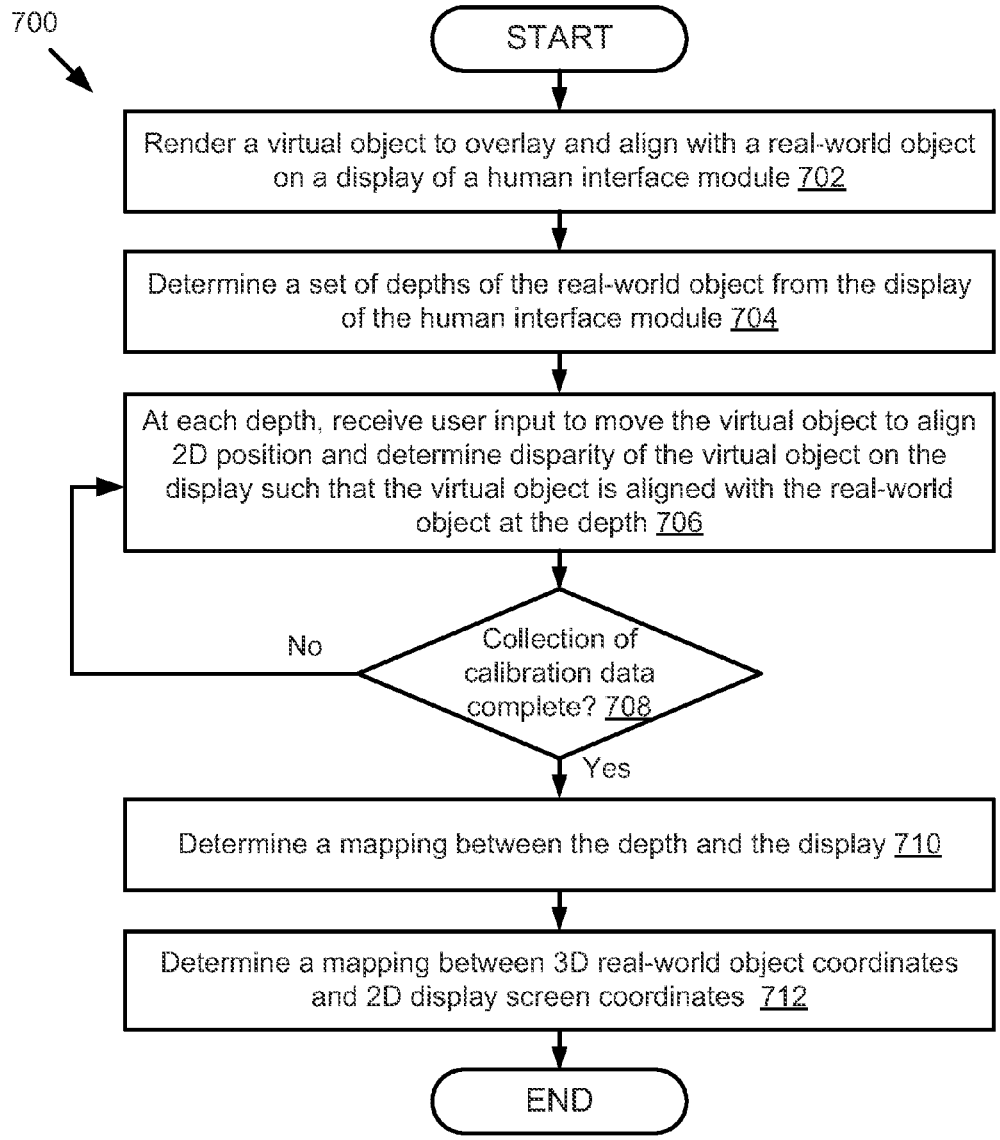
FIG. 7 is a flow diagram illustrating one embodiment of a joint 3D calibration method.

FIG. 7 is a flow diagram of one embodiment of a general method 700 for joint 3D calibration. At 702, the image delivery module 203 renders a virtual object to overlay and align with a real-world object on a display of a human interface module 102. At 704, the calibration engine 205 determines a set of depths of the real-world object from the eyes of the user. For example, the depth of the real-world object may be determined by detecting a fiducial marker on the real-world object and determining the fiducial marker's distance from the display of the human interface module 102. In another example, the depth of the real-world object may be determined by using a depth sensor associated with the human interface module 102. At 706, for each depth, the calibration engine 205 receives user input to move the virtual object to align 2D position and determines disparity of the virtual object on the display such that the virtual object is aligned with the real-world object at the depth. At 708, the calibration engine 205 determines whether the collection of calibration data is complete (e.g., the user sees that the virtual object is aligned in depth with the real-world object). If the collection of calibration data is incomplete, the calibration engine 205 repeats the process 706. If the collection of calibration data is complete, at 710, the calibration engine 205 determines a mapping between the depth and disparity and, at 712, determines a mapping between point coordinates of the 3D real-world object and 2D display screen coordinates. For example, the 3D coordinates of the real-world object may be detectable from a black and white patterned fiducial marker associated with the real-world object.

Figure 8:
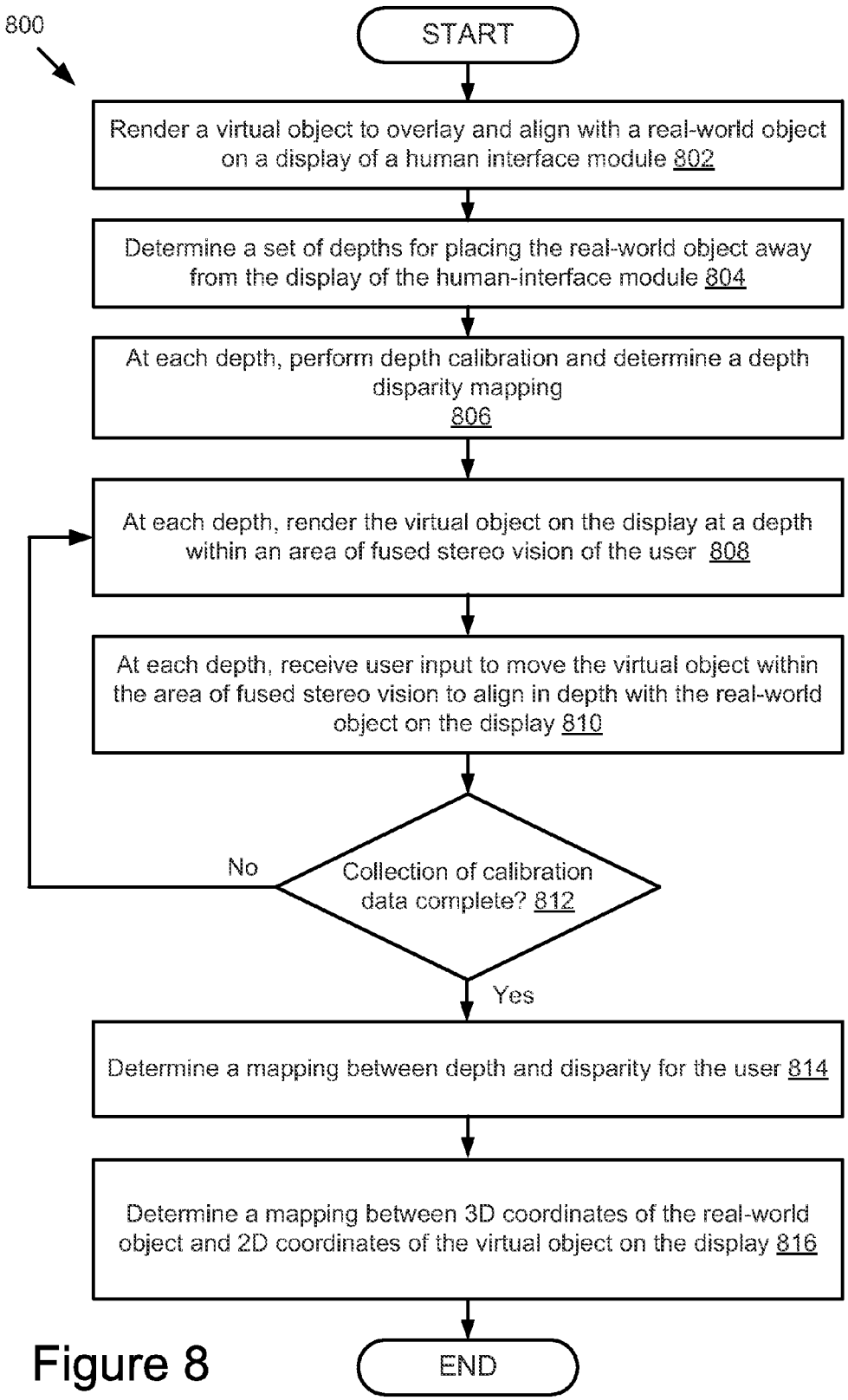
FIG. 8 is a flow diagram illustrating one embodiment of a joint 3D calibration method using paired eyes.

FIG. 8 is a flow diagram of one embodiment of a method 800 for joint 3D calibration using paired eyes. The calibration application 103 may include an image delivery module 203 and a calibration engine 205. At 802, the image delivery module 203 renders a virtual object to overlay and align with a real-world object on a display of a human interface module 102. At 804, the calibration engine 205 determines a set of depths for placing the real-world object away from the eyes of the user. For example, the calibration engine 205 determines a low distance/depth (0.5 meters or 2 diopter), a mid distance/depth (2.75 meters or 0.3636 diopter), and a far distance/depth (5 meters or 0.2 diopter). At 806, for each depth, the calibration engine 205 performs depth calibration and determine a depth disparity mapping. At 808, for each depth, use the depth disparity mapping of block 806 to render the virtual object on the display at a depth within an area of fused stereo vision of the user. In the area of fused stereo vision, the user's brain interprets disparate images seen by the two eyes as being the same object and perceives the depth of the object. At 810, for each depth, the calibration engine 205 receives user input to move the virtual object within the area of fused stereo vision to align in depth with the real-world object from the eyes of the user. At 812, the calibration engine 205 checks whether the collection of calibration data is complete (e.g., the user sees that the virtual object is aligned in depth with the real-world object). If the collection of calibration data is incomplete, the calibration engine 205 repeats the process 808 through 810. If the collection of calibration data is complete, at 814, the calibration engine 205 determines a mapping between depth and disparity for the user and, at 816, the calibration engine 205 determines a mapping between 3D coordinates of the real-world object and 2D coordinates of the virtual object on the display.

Figure 9A:
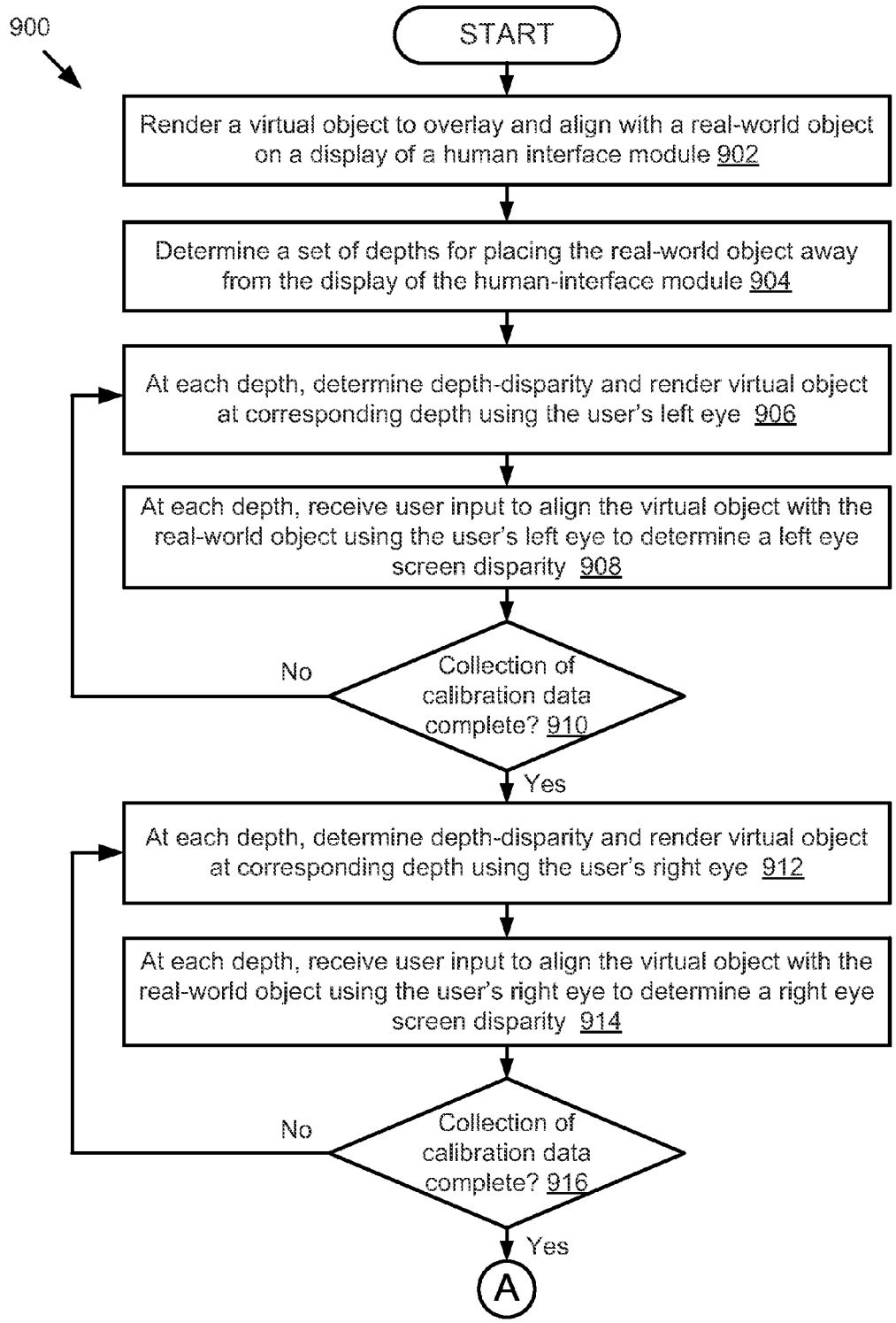
FIGS. 9A-9B are flow diagrams illustrating one embodiment of a joint 3D calibration method using separate eyes.
Figure 9B:
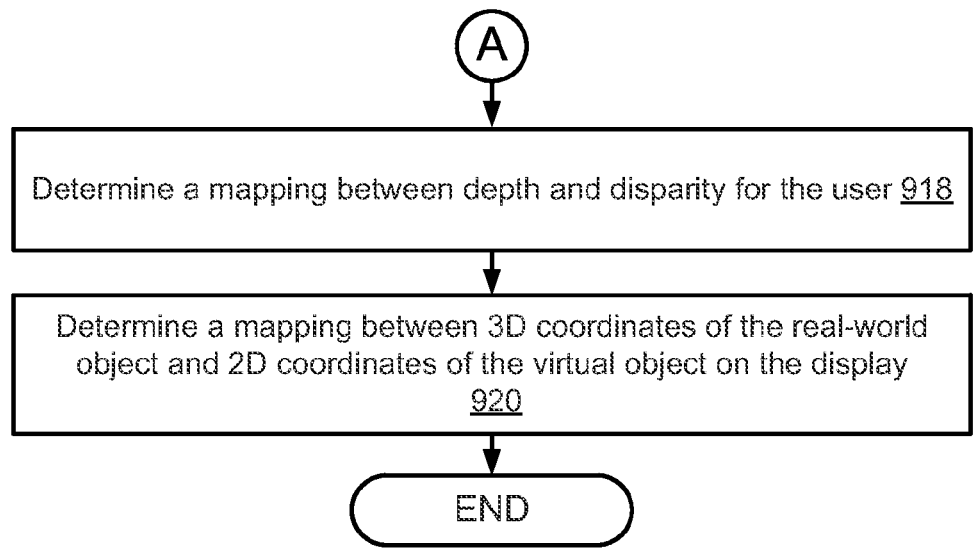

FIGS. 9A and 9B are flow diagrams of one embodiment of a method 900 for joint 3D calibration using separate eyes. At 902, the image delivery module 203 renders a virtual object to overlay and align with a real-world object on a display of a human interface module 102. For this example, the method assumes that the reference point is any chosen point. At 904, the calibration engine 205 determines a set of depths for placing the real-world object from the eye(s) of the user. At 906, for each depth, the calibration engine 205 determines depth-disparity and renders the virtual object at a depth corresponding to the determined depth-disparity using the user's left eye (e.g., while the right eye of the user is closed or occluded). At 908, for each depth, the calibration engine 205 receives user input to align the virtual object with the real-world object on the display using the user's left eye to determine the left eye screen disparity. The distance between the 2D position of the virtual object as seen by the user's left eye and the position of a reference screen point is equal to the left screen disparity L as shown in FIG. 10. For example, the disparity can be adjusted and measured in pixels, sub-pixels, ratio relative to the screen size, visual angle, etc. This produces what will be referred to as the left eye screen disparity for this method 900. At 910, the calibration engine 205 checks whether the collection of calibration data is complete (e.g., the virtual object aligns with the real-world object). If the collection of calibration data using the left eye is incomplete, the calibration engine 205 repeats the process 906 through 908. If the collection of calibration data using the left eye is complete, at 912, for each depth, the calibration engine 205 determines depth-disparity and renders the virtual object at a depth corresponding to the determined depth-disparity using the user's right eye (e.g., while the left eye of the user is closed or occluded). At 914, for each depth, the calibration engine 205 receives user input to align the virtual object with the real-world object on the display using the user's right eye and produces right eye disparity for this method 900. The distance between the 2D position of the virtual object as seen by the user's right eye and the position of a reference screen point is equal to the right screen disparity R as shown in FIG. 10. At 916, the calibration engine 205 checks whether the collection of calibration data using the right eye is complete (e.g., the virtual object aligns with the real-world object as seen through each eye separately). If the collection of calibration data using the right eye is incomplete, the calibration engine 205 repeats the process 912 through 914. If the collection of calibration data using the right eye is complete, at 918, the calibration engine 205 determines a mapping between depth and total screen disparity for the user. The combination of the left eye screen disparity and the right eye screen disparity determines the total screen disparity. For example, for the geometry in FIG. 10 the total disparity is a sum of the left and right disparity L+R. For another reference point it can also be L−R, depending on the position of the virtual object image. At 920, determines a mapping between 3D coordinates of the real-world object and 2D coordinates of the virtual object on the display. In some embodiments, the method 900 applies various types of regression algorithms on the left eye or right eye data. For example, different types of regression algorithms can be applied to depth-disparity data, or 2D-3D point correspondence data. Additionally, it should be note that in the above described embodiment reference point is any chosen point. However, in other embodiment, the reference point may be selected to be, for example, the virtual object 2D position on the left eye. In such a case, the above method performs a 2D position calibration on the left eye (e.g., left disparity is zero) and then performs right disparity determination for the right eye. This produces a total disparity that is equal to the right eye disparity in this case.

A system and method for calibrating a binocular optical see-through augmented reality display has been described. In the above description, for purposes of explanation, numerous specific details are set forth in order to provide a thorough understanding of the techniques introduced above. It will be apparent, however, to one skilled in the art that the techniques can be practiced without these specific details. In other instances, structures and devices are shown in block diagram form in order to avoid obscuring the description and for ease of understanding. For example, the techniques are described in one embodiment above primarily with reference to software and particular hardware. However, the present invention applies to any type of computing system that can receive data and commands, and present information as part of any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions described above are presented in terms of algorithms and symbolic representations of operations on data bits within a computer memory. These algorithmic descriptions and representations are, in some circumstances, used by those skilled in the data processing arts to convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. One embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the techniques are not described with reference to any particular programming language. It will be appreciated that a variety of programming languages may be used to implement the teachings of the various embodiments as described herein.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
   rendering, with one or more processors, a virtual object on a display of a human interface module positioned relative to a real-world object;
   receiving, with the one or more processors, user input to align the virtual object with the real-world object at a first depth between an eye of a user and the real-world object, wherein the user input includes a first portion to align a two-dimensional position of the virtual object with the real-world object on the display with the user's left eye and a second portion to adjust screen disparity using the user's right eye;
   determining, with the one or more processors, a disparity for the first depth based on the user input to align the virtual object with the real-world object; and
   determining, with the one or more processors, a mapping between the first depth and the disparity, based on the first portion and the second portion of the user input.

2. The method of claim 1 comprising determining the first depth between the eye of the user and the real-world object.

3. The method of claim 2 wherein determining the first depth is based on one from the group of: the user input, a received depth from a sensor, and processing of input by the human interface module.

4. The method of claim 1 comprising:
   receiving a second user input to align the virtual object with the real-world object at a second depth between the eye of the user and the real-world object;
   determining a second disparity for the second depth based on the second user input to align the virtual object with the real-world object; and
   determining a second mapping between the second depth and the disparity.

5. The method of claim 4 comprising:
   receiving a third user input to align the virtual object with the real-world object at a third depth between the eye of the user and the real-world object;
   determining a third disparity for the third depth based on the third user input to align the virtual object with the real-world object;
   determining a third mapping between the second depth and the disparity; and
   wherein the first depth is a near distance, the second depth is a mid distance and the third depth is a far distance.

6. The method of claim 1 further comprising determining a slope value based on the mapping between the depth and the disparity being linear, wherein the slope value is a constant.

7. The method of claim 1, further comprising:
   in response to the received user input, moving the virtual object on the display until it falls within an area of fused stereo vision of the user;
   in response to the received user input, aligning the virtual object on the display with the real-world object at a perceived depth within the area of fused stereo vision; and
   wherein determining the disparity for the first depth is based on the user input to move and align the virtual object within the area of fused stereo vision of the user.

8. The method of claim 7, further comprising:
   performing depth calibration to determine a depth disparity mapping;

using the determined depth disparity mapping to render the virtual object on the display at a depth;

in response to the received user input, aligning the virtual object on the display with the real-world object at the perceived depth within the area of fused stereo vision;

determining a correct depth from the mapping between the depth and the disparity;

determining a mapping between three-dimensional point coordinates of the real-world object and two-dimensional pixel coordinates of the virtual object on the display based on the correct depth.

9. The method of claim 1, further comprising:

in response to the first portion of the user input, moving the virtual object on the display until the virtual object and the real-world object align in the two-dimensional position; and in response to the second portion of the user input, moving the virtual object to adjust screen disparity so a same image is seen with both eyes.

10. The method of claim 1 wherein:

determining the disparity for the first depth includes determining first eye calibration data and determining second eye calibration data; and determining the mapping between the first depth and the disparity includes performing a two-dimensional calibration regression using the first eye calibration data and performing a three-dimensional calibration regression using the second eye calibration data.

11. A system comprising:

a processor; and a memory storing instructions that, when executed, cause the system to:

render a virtual object on a display of a human interface module positioned relative to a real-world object;

receive user input to align the virtual object with the real-world object at a first depth between the an eye of a user and the real-world object, wherein the user input includes a first portion to align a two-dimensional position of the virtual object with the real-world object on the display with the user's left eye and a second portion to adjust screen disparity using the user's right eye;

determine a disparity for the first depth based on the user input to align the virtual object with the real-world object; and determine a mapping between the first depth and the disparity, based on the first portion and the second portion of the user input.

12. The system of claim 11 wherein the memory also stores instructions that, when executed, cause the system to determine the first depth between the eye of the user and the real-world object.

13. The system of claim 12, wherein determining the first depth is based on one from the group of: the user input, a received depth from a sensor, and processing of input by the human interface module.

14. The system of claim 11 wherein the memory also stores instructions that, when executed, cause the system to:

receive a second user input to align the virtual object with the real-world object at a second depth between the eye of the user and the real-world object;

determine a second disparity for the second depth based on the second user input to align the virtual object with the real-world object; and determine a second mapping between the second depth and the disparity.

15. The system of claim 14 wherein the memory also stores instructions that, when executed, cause the system to:

receive a third user input to align the virtual object with the real-world object at a third depth between the eye of the user and the real-world object;

determine a third disparity for the third depth based on the third user input to align the virtual object with the real-world object;

determine a third mapping between the second depth and the disparity; and wherein the first depth is a near distance, the second depth is a mid distance and the third depth is a far distance.

16. The system of claim 11 wherein the memory also stores instructions that, when executed, cause the system to determine a slope value based on the mapping between the depth and the disparity being linear, wherein the slope value is a constant.

17. The system of claim 11 wherein the memory also stores instructions that, when executed, cause the system to:

in response to the received user input, move the virtual object on the display until it falls within an area of fused stereo vision of the user;

in response to the received user input, align the virtual object on the display with the real-world object at a perceived depth within the area of fused stereo vision; and wherein the determination of the disparity for the first depth is based on the user input to move and align the virtual object within the area of fused stereo vision of the user.

18. The system of claim 17 wherein the memory also stores instructions that, when executed, cause the system to:

perform depth calibration to determine a depth disparity mapping;

use the determined depth disparity mapping to render the virtual object on the display at a depth;

in response to the received user input, align the virtual object on the display with the real-world object at the perceived depth within the area of fused stereo vision;

determine a correct depth from the mapping between the depth and the disparity;

determine a mapping between three-dimensional point coordinates of the real-world object and two-dimensional pixel coordinates of the virtual object on the display based on the correct depth.

19. The system of claim 11 wherein the memory also stores instructions that, when executed, cause the system to:

in response to the first portion of the user input, move the virtual object on the display until the virtual object and the real-world object align in the two-dimensional position; and in response to the second portion of the user input, move the virtual object to adjust screen disparity so a same image is seen with both eyes.

20. The system of claim 11 wherein the memory also stores instructions that, when executed, cause the system to:

determine the disparity for the first depth includes determining first eye calibration data and determining second eye calibration data; and wherein the determination of the mapping between the first depth and the disparity includes performing a two-dimensional calibration regression using the first eye calibration data and performing a three-dimensional calibration regression using the second eye calibration data.

* * * * *